April 6, 1954

C. C. CUTLER

FREQUENCY CHANGING REPEATER EMPLOYING FEEDBACK AMPLIFIERS

Filed Sept. 13, 1950

2,674,692

INVENTOR
C.C. CUTLER
BY
George C. Lord
ATTORNEY

Patented Apr. 6, 1954

2,674,692

UNITED STATES PATENT OFFICE 2,674,692

FREQUENCY CHANGING REPEATER EMPLOYING FEEDBACK AMPLIFIERS

Cassius C. Cutler, Gillette, N. J., assignor to Bell Telephone Laboratories, Incorporated, New York, N. Y., a corporation of New York Application September 13, 1950, Serial No. 184,678

9 Claims. (Cl. 250—27)

This invention relates to pulse repeaters and more particularly to frequency shifting repeaters for use in pulsed microwave radio relay systems.

When intelligence is to transmitted by pulse modulation as, for example, by pulse position modulation wherein the position of a pulse with respect to a datum point normally indicated by a marker pulse is representative of the instantaneous amplitude of a message wave, or by pulse code modulation wherein a group of a fixed number of by-valued pulses is employed according to a code to represent the same information, it is usual to transmit the appropriate pulses by microwave radio.

This method of transmission necessitates the use of a plurality of repeater stations intermediate the transmitting and receiving terminals, each of these repeaters being required to restore the pulse signal levels to acceptable values to avoid degradation of the transmitted intelligence as a result of fading or extraneous noise voltages. It is usual, in order to prevent crosstalk or interference between the pulse signals received and retransmitted at each repeater station, to shift the center frequency of the radio frequency pulses at each such station. (A radio frequency pulse may be considered as comprising a plurality of separate waves the amplitude and frequency of each of which is determinable by Fourier analysis. The center frequency of such a radio frequency pulse is the mean frequency of such component frequencies.)

Most of the repeater stations heretofore employed in pulse microwave radio relay systems have employed apparatus for receiving and retransmitting the signal which has included circuits for the detection and/or demodulation of the incoming radio frequency signals, the generation, of a new radio frequency carrier, and the radiation of the new radio frequency in a series of pulses corresponding to the pulse wave obtained by demodulating the incoming radio frequency pulses. Such apparatus is necessarily relatively complicated and requires, with the necessary standby equipment, the provision of large amounts of relatively expensive apparatus at each repeater station.

It is the object of the present invention to provide simplified pulse repeaters for use in radio relay systems in which the center frequency of received pulses is shifted without the necessity of demodulation and remodulation.

The basic frequency shifting pulse repeater, in accordance with the present invention, comprises a broad band amplifier and a narrow band feedback loop therefor. Pulses applied to the input of the amplifier are amplified in the usual fashion and are accepted by the feedback loop which includes pulse-sharpening apparatus, such as an expander, and input and output filters for the pulse-sharpening apparatus. The input filter is tuned to a center frequency substantially equal to the center frequency of the incoming radio frequency pulses, while the output filter is tuned to a frequency differing therefrom. Pulses of the new center frequency, thus reapplied to the input of the amplifier, are further amplified and appear at the output thereof. These pulses will no longer be accepted by the feedback loop and are available in an output circuit, the frequency characteristics of which are such as to accept only pulses of the new center frequency and to reject pulses of the incoming or original center frequency.

Modifications of the invention include a frequency shifting repeater, wherein a plurality of narrow band feedback loops are provided for a single amplifier. Each of these loops includes an expander or other pulse-sharpening circuit, a first filter connected to the input of each expander, and a second filter connected between the output of each expander and the common input to the pulse amplifier. As in the case of the basic circuit, the pass bands of the various filters are so chosen that a pulse traversing the amplifier is accepted for one trip through each feedback loop and thenceforth is rejected by that feedback loop and further the input filters of the several feedback loops are chosen to accept pulses the center frequencies of which are progressively further removed from that of the original input pulses. Still another modification of the invention involves a self-excited pulse generator in which a variation of the basic pulse repeater circuit is employed to provide an output which comprises a train of pulses, alternate ones of which have different center frequencies.

The above and other features of the invention will be described in further detail in the following specification taken in connection with the drawings in which.

In the above, the invention has been described in its principal application to repeaters for microwave radio relay stations. It will be convenient, therefore, in the following detailed description to consider circuits according to the invention arranged for operation at microwave frequencies. It should be understood, however, that the basic repeater of the invention may be used equally well at any other frequency for which circuit components having the necessary frequency characteristics are available.

Figure 1:
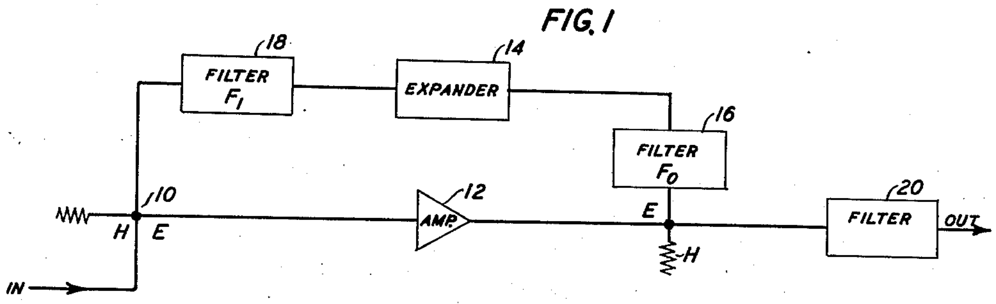
Fig. 1 is a block diagram of the basic frequency-changing repeater of the invention.

Fig. 1 represents the basic pulse repeater of the invention. Radio frequency pulses arriving at the repeater are applied through a hybrid network 10 to the input of a broad band amplifier 12. For operation at microwave frequencies, the hybrid network may conveniently comprise a wave guide hybrid junction of the type disclosed in Fig. 7 of Patent 2,445,896 to Tyrrell, July 27, 1948 and in the article by Tyrrell in the I. R. E. Proceedings for November 1947 beginning at page 1294. This hybrid junction comprises four wave guide arms, two of which are colinear and the other two of which are joined thereto at a common point and perpendicular both to each other and to the colinear arms, the last-mentioned pair of arms being arranged respectively in planes of the magnetic and electric vectors of the wave in the colinear arms to provide an array of double conjugacy. This junction is connected in circuit in the usual fashion so that incoming pulses of microwave frequency may be applied to the input of amplifier 12 without interference with additional circuits also to be connected to the input of the amplifier.

Amplifier is preferably a broad band amplifier capable of providing substantial amplification at the frequency of the incoming radio frequency pulses. Such characteristics are exhibited by traveling wave amplifiers of the type described in articles in the I. R. E. Proceedings for February 1947 entitled "Traveling Wave Tubes" by J. R. Pierce and L. M. Field at page 108, "Theory of Beam Type Traveling Wave Tubes" by J. R. Pierce at page 111 and "The Traveling Wave Tube as Amplifier at Microwaves" by R. Kompfner at page 124.

The feedback loop by means of which the amplified pulses appearing at the output of amplifier 12 may be applied to the input thereof includes a pulse-sharpening circuit, shown herein as an expander 14, a first filter 16 connected between the output of amplier 12 and the input of expander 14, and a second filter 18 connected between the output of expander 14 and a second input circuit of the hybrid network 10. The expander 14 may, for operation at microwave frequencies, conveniently comprise a wave guide circuit of the type disclosed in my copending application Serial No. 118,890, filed September 30, 1949, now Patent No. 2,652,541 issued September 15, 1953. This expander comprises a second wave guide hybrid junction similar to that disclosed in the Tyrrell patent referred to above, one pair of conjugate arms of which is employed for input and output circuits while the arms of the other pair have mounted therein identical non-linear impedances which are matched to the impedances of the respective arms in which they are mounted for input signals of low amplitudes, one of the non-linear impedances being one-quarter wavelength further removed from the junction of the arms than the other. For incoming signals of low amplitudes, the non-linear impedances are matched to the corresponding wave guide arms and relatively little output is obtained from the expander. As the amplitude of the incoming signal increases, however, the non-linear impedances become progressively more poorly matched to the arms and reflect increasingly larger portions of the incoming signals to the output of the expander. Such an expander provides an essentially square law expansion characteristic at microwave frequencies.

The circuits interconnecting the several elements of the repeater of Fig. 1 may comprise wave guides or coaxial lines, and filters 16 and 18 may comprise any of the well-known types of filters suitable to the frequency range and type of interconnecting circuits used; for example, the usual double iris wave guide filters as disclosed in Patent No. 2,432,093 to A. G. Fox, December 9, 1947. Each of the filters 16 and 18 comprises a band-pass filter. The pass band of filter 16 is centered at a frequency $F_0$ substantially equal to the center frequency of the incoming pulses applied to the repeater, while the pass band of filter 18 is centered at a frequency $F_1$ differing from frequency $F_0$ in accordance with the relationship to be described hereinafter. An output circuit is provided at the output of amplifier 12 and includes a filter 20 similar to filters 16 and 18 and having a pass band centered at frequency $F_1$.

Figure 2:
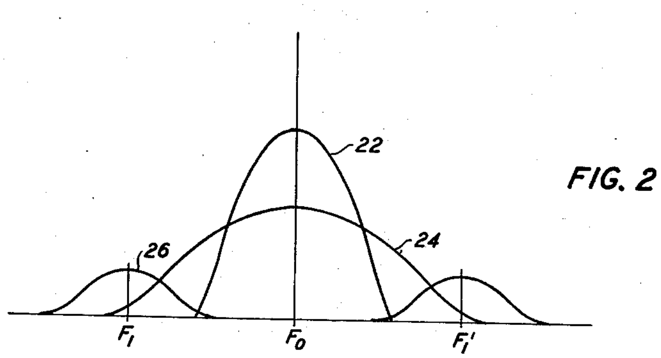
Fig. 2 is a graph illustrating certain features of the operation of the circuit of Fig. 1.

The operation of the circuit of Fig. 1 may now be considered with particular reference to the curves of Fig. 2. Let it be assumed, for example, that the radio frequency pulses arriving at the repeater station have a pulse spectrum of the usual Gaussian form centered at frequency $F_0$ as indicated by curve 22 of Fig. 2. These pulses are applied through the hybrid network 10 to amplifier 12 in which they are amplified without material change in the frequency spectrum. Filter 16 is so arranged that the pulses emerging therefrom at center frequency $F_0$ have a frequency spectrum which is substantially unchanged from that of the applied pulses as indicated by curve 22 of Fig. 2. These pulses are then applied to expander 14 which has a substantially square law characteristic and may in a typical instance sharpen the pulses sufficiently to halve the pulse length and correspondingly to double the frequency spectrum. The spectrum of the pulses emerging from expander 14 may, therefore, be represented by curve 24 of Fig. 2 centered upon the same frequency $F_0$ as the pulses originally applied to the repeater.

The center frequency $F_1$ of the pass band of filter 18 is, according to the invention, removed from the center frequency $F_0$ by an amount which is greater than one-half the frequency spectrum of the pulse at the output of filter 16 and less than one-half the frequency spectrum of the pulses at the output of expander 14. It will be recognized that two new center frequencies are possible and these are indicated at $F_1$ and $F_1'$ of Fig. 2. It will be understood that either of these new frequencies may be chosen. Filter 18 inevitably broadens the pulses passing therethrough and correspondingly produces pulses of a narrower frequency spectrum as illustrated by curve 26 of Fig. 2, depending upon which center frequency is chosen for filter 18.

The pulses appearing at the output of filter 18 have a new center frequency $F_1$ differing substantially from the center frequency $F_0$ of the incoming pulses at the repeater station. These pulses are applied through hybrid network 10 to amplifier 12 where they receive further amplification. The pulses of center frequency $F_1$ appearing at the output of amplifier 12 are rejected by the filter 16 but may be abstracted through an output circuit including a filter 20, the pass band of which is centered at frequency $F_1$.

It will be recognized that pulses of center frequencies $F_0$ and $F_1$ may traverse the amplifier 12 substantially simultaneously. If, however, the amplifier has a linear characteristic, no intermodulation of the two center frequencies will occur therein and the frequency characteristics of filters 16, 18 and 20, as defined in connection with the consideration of Fig. 2, are substantially non-overlapping so that pulses of center frequency $F_0$ reach the expander with much greater amplitude than components of other frequencies. Although the expander may, because of its non-linear characteristic, produce intermodulation if pulses of two different center frequencies are applied thereto simultaneously, the extraneous pulses and such modulation products will, because of their low amplitude, be suppressed by expander action. Alternatively, if desirable, a delay network may be inserted between hybrid network 10 and amplifier 12 to insure that only a single pulse can reach expander 14 at any given time.

Figure 3:
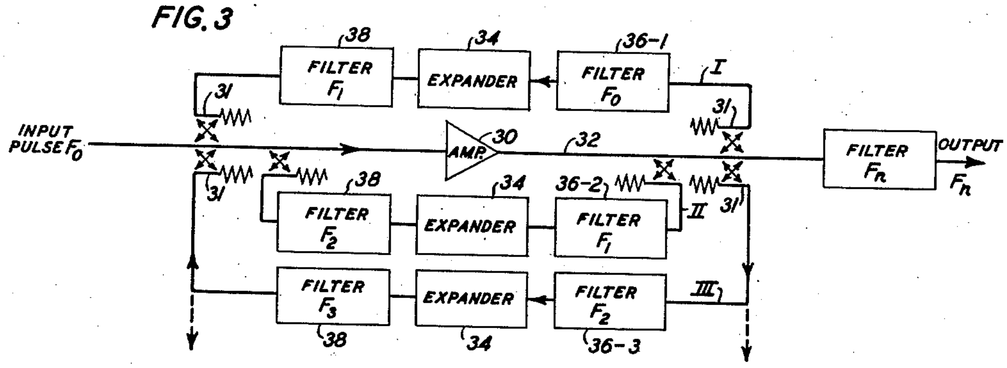
Fig. 3 is a block diagram of a modification of the invention arranged to provide greater frequency shifts than those obtainable with the circuit of Fig. 1.

In certain instances it may be desirable to produce greater changes in the center frequency of pulses arriving at a repeater station than can be obtained in the arrangement of Fig. 1. The modification of the invention disclosed in Fig. 3 operates upon the same principle and makes possible shifting of the center frequency of incoming pulses to an extent which is limited only by the pass band of the available pulse amplifier. As shown in Fig. 3, a broad band pulse amplifier 30 is connected in a main wave guide 32 and radio frequency pulses arriving at the repeater are applied thereto. A plurality of feedback loops are provided for amplifier 30, three being shown by way of example in Fig. 3. These feedback loops are connected to the main guide by directional couplers 31 of the type disclosed in the I. R. E. Proceedings for February 1947 at page 160. In each instance, the branch lines which form a part of the feedback loops are terminated by a suitable load arranged to absorb energy not coupled to the main guide in the desired direction. Each of the feedback loops includes an expander or a pulse-sharpening circuit 34, an input filter 36 and an output filter 38. The amplifier 30, the expander 34 and the filters 36 and 38 correspond to similarly labeled elements of the circuit of Fig. 1 and may conveniently be identical thereto. Incoming pulses applied to amplifier 30 are amplified and are accepted by input filter 36—1 having a pass band centered at their center frequency $F_0$. The input filters 36—2 and 36—3 for the other feedback networks are arranged for different pass bands and reject pulses of this center frequency. The center frequency of the pulses is shifted in the first feedback network and pulses of center frequency $F_1$ are then applied to the input of amplifier 30. These pulses are accepted by the input filter of the second feedback network and are rejected by the input filters of the first and third feedback networks and undergo a further shift in center frequency to frequency $F_2$ in the second feedback network. Pulses reapplied to the amplifier 30 at the center frequency $F_2$ are amplified and again appear at the output thereof. These pulses are in similar fashion accepted only by the third feedback network in which the center frequency is shifted to $F_3$. Although only three feedback networks have been shown, the process may be repeated indefinitely within the limitations imposed by the pass band of amplifier 30 until the pulses have finally been shifted to a center frequency $F_n$ where $n$ represents the number of transmission paths employed. Pulses may then be abstracted from the circuit through an output circuit including a filter 40 tuned to center frequency $F_n$.

The relationships among the different center frequencies $F_0$, $F_1$, $F_2$, $F_3$ . . . $F_n$ are established in the same manner as the relationships between frequencies $F_0$ and $F_1$ for the circuit of Fig. 1. In general, the difference between adjacent ones of the center frequencies must be more than one-half the frequency spectrum of the pulses at the output of any filter and less than half the frequency spectrum of the pulses at the output of the adjacent expander.

Figure 4:
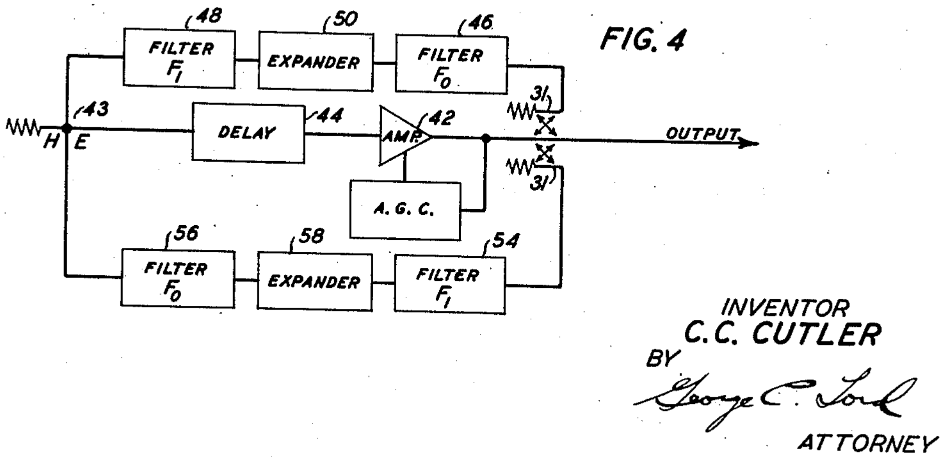
Fig. 4 is a block diagram illustrating a further modification of the circuit of Fig. 1 to provide a self-exciting pulse generator.

The pulse frequency shifting principle of the invention may be employed as shown in Fig. 4 in a self-exciting regenerative pulse generator. Here a broad band amplifier 42 is provided with automatic gain control and with a pair of feedback networks similar to those heretofore described and each including an expander, an input filter connected through a directional coupler 31 between the output of the amplifier and the input of the expander, and a second or output filter connected between the expander and through a hybrid junction 43 to the input of a delay unit 44 common to the two feedback loops. In the first feedback network, input filter 46 has a pass band centered at a frequency $F_0$, while output filter 48 has a pass band centered at frequency $F_1$, the relationship between these two frequencies being substantially that between the frequencies $F_0$ and $F_1$ of the filters of Fig. 1. Filters 46 and 48 and expander 50, as well as amplifier 42, may be of the same type as those described in connection with Fig. 1. The second feedback network connected to the output of the amplifier includes input and output filters 54 and 56, respectively, and a second expander 58. In this network, however, the input filter 54 has a pass band centered at frequency $F_1$ approximately equal to the frequency $F_1$ upon which the pass band of filter 48 is centered, while the output filter 56 has a pass band centered at frequency $F_0$ substantially equal to the frequency $F_0$ for which filter 46 is designed.

If it be assumed that a pulse of center frequency $F_0$ is present in amplifier 42, it will be recognized, in view of what has been said above in connection with the operation of the repeaters of Figs. 1 and 3, that this pulse will traverse the first feedback network being shifted to a center frequency $F_1$, will retraverse the amplifier 42 and enter the second feedback network. Here, because of the relationship of the pass bands of filters 54 and 56, the center frequency of the pulse will be shifted back to frequency $F_0$ and the process will be repeated. If the delay introduced by delay line or network 44 is equal to a desired pulse interval, it will be recognized that there is available at the output of amplifier 42 a train of periodic pulses alternate ones of which have center frequencies $F_0$ and $F_1$. Obviously, the trains of pulses having greater numbers of different center frequencies and regularly interleaved may be obtained by the provision of additional feedback circuits for amplifier 42.

In the above, it has been assumed that a pulse of center frequency $F_0$ was already present in amplifier 42. The circuit of Fig. 4, however, may be self-exciting and will operate in the same way with no pulse applied from an external source. Thus, if amplifier 42 is provided with automatic gain control as indicated, the circuit may be considered as operating in the following manner. When operating voltages are first applied to the amplifier noise potentials which may be considered as pulse-like voltages of different frequencies will be present therein. If a noise pulse falling within the pass band either of filters 46 or 54 is present at this time it will pass through the corresponding feedback circuit and will be increased in amplitude by the expander. Other pulses also falling within the pass bands of the two input filters may also reach one or the other of the expanders. However, one of these noise pulses will inevitably be of greater amplitude than any of the others and will, therefore, receive a greater increase in amplitude by virtue of expander action. These pulses will reach the input of amplifier 42 which, because of the automatic gain control provided therefor, will be biased by the pulse of largest amplitude to provide less amplification for the other pulses. The pulse of largest amplitude will then undergo frequency shift in the other feedback network and will reappear at the input of amplifier 42 in the usual fashion. Upon successive transversals of the two feedback loops, all but the largest pulse will be suppressed both because of the fact that the expanders will favor the largest pulse and also because the automatic gain control action of the amplifier, in response to the passage of the largest pulse, will progressively decrease the amplitude of any other pulses present in the circuit. After several transversals of the two feedback loops, a single pulse will be present in the circuit which will then operate as assumed above.

What is claimed is:

1. A frequency-changing repeater for pulses of center frequency $F_0$ comprising an amplifier for said pulses, a feedback loop for said amplifier including in the order stated a filter accepting pulses of said center frequency $F_0$ only, means for sharpening pulses and a second filter accepting only pulses of center frequency $F_1$ different from center frequency $F_0$ and an output circuit for said amplifier accepting pulses of center frequency $F_1$ only.

2. A frequency-changing pulse amplifier for pulses of center frequency $F_0$ comprising an amplifier for said pulses, a feedback circuit therefore including in the order stated a filter accepting pulses of said center frequency $F_0$ only, an expander for operating upon said pulses and a second filter accepting only pulses of center frequency $F_1$ different from center frequency $F_0$ and an output circuit for said amplifier including a filter accepting pulses of center frequency $F_1$ only.

3. A frequency-shifting pulse repeater for pulses of center frequency $F_0$ comprising a broad band amplifier for said pulses, a narrow band feedback circuit for said amplifier including first and second filters and an expander, said first filter being connected between the output of said amplifier and said expander and accepting pulses of center frequency $F_0$ only and said second filter being connected between the output of said expander and the input of said amplifier and accepting pulses of center frequency $F_1$ only.

4. A frequency-changing repeater for pulses of center frequency $F_0$ comprising an amplifier for said pulses, a feedback circuit for said amplifier including in the order stated a first filter having a pass band centered at said center frequency $F_0$ and producing an output pulse the frequency spectrum of which is substantially the same as that of its input pulses, a pulse-sharpening circuit producing an output pulse of the same center frequency as its input pulses but of a spectrum approximately twice that of the input pulses and a second filter having a pass band centered upon a frequency $F_1$ which is removed from said center frequency $F_0$ by an amount greater than one-half the frequency spectrum of the pulses from said first filter and less than one-half the frequency spectrum of pulses from said pulse-sharpening circuit.

5. A frequency-changing repeater for pulse signals of center frequency $F_0$ comprising a pulse amplifier and $n$ feedback circuits connected between the output and the input of said amplifier, each of said $n$ circuits including means for sharpening pulses applied thereto, a first filter connected between the output of said amplifier and the input of said pulse-sharpening means, and a second filter connected to the output of said pulse-sharpening means, the frequencies upon which the pass bands of said first filters are centered for the several loops being $F_0$, $F_1$, $F_2$, $F_3 \ldots F_{n-1}$ and the corresponding frequencies for said second filters in the corresponding loops being respectively $F_1$, $F_2$, $F_3 \ldots F_n$.

6. A frequency-changing repeater for pulse signals of center frequency $F_0$ comprising a broad band pulse amplifier and $n$ narrow band feedback loops therefor, each of said $n$ loops including an expander, a first filter connected to the input of said expander and a second filter connected to the output of said expander, the filter frequencies for the first filters of the several loops being respectively $F_0$, $F_1$, $F_2$, $F_3 \ldots F_{n-1}$ and the filter frequencies for said second filters in the corresponding loops being respectively $F_1$, $F_2$, $F_3$, $F_4 \ldots F_n$, and an output circuit connected to said amplifier and arranged to accept pulses of center frequency $F_n$ only.

7. A frequency-changing pulse repeater for pulses of center frequency $F_0$ comprising an amplifier for said pulses, a feedback circuit for said amplifier including pulse-sharpening means and input and output filters therefor, said input filter accepting only pulses of center frequency $F_0$ and said output filter accepting only pulses of center frequency $F_1$ and a second feedback loop for said amplifier comprising pulse-sharpening means and input and output filters therefor, the input filter for said second loop accepting pulses only of said center frequency $F_1$ and the output filter for said loop accepting only pulses of center frequency $F_2$, and an output circuit for said amplifier accepting only pulses of center frequency $F_2$.

8. In a pulse-generating circuit for producing a train of pulses the frequencies of alternate ones of which are respectively $F_0$ and $F_1$, a pulse amplifier, a first feedback loop therefor, including an expander and input and output filters for said expander, said input filter accepting pulses of fresuency $F_0$ only and said output filter accepting pulses of frequency $F_1$ only and a second feedback loop for said amplifier including an expander and input and output filters therefor, the input filter of said second loop accepting only pulses of said frequency $F_1$ and the output of said second loop accepting only pulses of frequency $F_1$.

9. In a self-excited pulse generator circuit for producing a train of pulses the frequencies of alternate ones of which are respectively $F_0$ and $F_1$, a pulse amplifier, a first feedback loop therefor, including an expander and input and output filters for said expander, said input filter accepting pulses of frequency $F_0$ only and said output filter accepting pulses of frequency $F_1$ only and a second feedback loop for said amplifier including an expander and input and output filters therefor, the input filter of said second loop accepting only pulses of said frequency $F_1$, the output of said second loop accepting only pulses of frequency $F_0$ and an automatic gain control circuit limiting the amplitude of pulses circulated through said amplifier to a predetermined level.

References Cited in the file of this patent

UNITED STATES PATENTS

| Number | Name | Date |
|---|---|---|
| 2,117,698 | Budenbom | May 17, 1938 |
| 2,163,403 | Meacham | June 30, 1939 |
| 2,173,427 | Scott | Sept. 19, 1939 |
| 2,436,891 | Higginbotham | Mar. 2, 1948 |